United States Patent
Richer De Forges et al.

(10) Patent No.: US 9,557,430 B2
(45) Date of Patent: Jan. 31, 2017

(54) METHOD AND SYSTEM FOR LOW-FREQUENCY PRESSURIZED SOURCE

(71) Applicant: CGG SERVICES SA, Massey (FR)

(72) Inventors: Herve Richer De Forges, Massy (FR); Robert Dowle, Massy (FR); John Sallas, Plano, TX (US)

(73) Assignee: CGG SERVICES SA, Massy (FR)

( * ) Notice: Subject to any disclaimer, the term of this patent is extended or adjusted under 35 U.S.C. 154(b) by 0 days.

(21) Appl. No.: 14/982,073

(22) Filed: Dec. 29, 2015

(65) Prior Publication Data
US 2016/0131777 A1    May 12, 2016

Related U.S. Application Data (62) Division of application No. 14/177,537, filed on Feb. 11, 2014, now Pat. No. 9,250,337.

(60) Provisional application No. 61/839,938, filed on Jun. 27, 2013.

(51) Int. Cl.
G01V 1/135 (2006.01)

(52) U.S. Cl.
CPC ....... *G01V 1/135* (2013.01); *G01V 2210/1214* (2013.01); *G01V 2210/1293* (2013.01)

(58) Field of Classification Search
CPC ............... G01V 2210/1214; G01V 2210/1293; G01V 1/135
USPC ................................. 181/113, 120; 367/144
See application file for complete search history.

(56) References Cited

U.S. PATENT DOCUMENTS

| | | | |
|---|---|---|---|
| 3,721,311 A | 3/1973 | Mott-Smith | |
| 3,949,831 A | 4/1976 | Cassand et al. | |
| 4,185,714 A * | 1/1980 | Pascouet | F15C 1/22 181/115 |
| 4,240,518 A * | 12/1980 | Chelminski | G01V 1/04 181/107 |
| 4,303,141 A * | 12/1981 | Pascouet | G01V 1/133 181/115 |
| 4,396,088 A | 8/1983 | Bayhi | |
| 4,594,697 A * | 6/1986 | Pascouet | G01V 1/133 124/71 |
| 4,798,261 A | 1/1989 | Chelminski | |
| 4,885,726 A | 12/1989 | Myers | |
| 6,076,630 A | 6/2000 | Ambs | |
| 8,387,744 B2 | 3/2013 | Harper et al. | |
| 8,593,904 B2 | 11/2013 | Soubaras | |
| 2009/0316523 A1 | 12/2009 | Ross | |

(Continued)

FOREIGN PATENT DOCUMENTS

WO    2010/088206 A1    8/2010

OTHER PUBLICATIONS

International Search Report and Written Opinion in related International Application No. PCT/EP2014/063515, mailed Jan. 20, 2015.

*Primary Examiner* — Jeremy Luks
(74) *Attorney, Agent, or Firm* — Patent Portfolio Builders PLLC (57) ABSTRACT

A source element for generating seismic waves includes a housing; a partitioning element placed inside the housing and configured to split the housing in a closed chamber and an opened chamber; and a valve in fluid communication with the closed chamber and configured to supply high-pressure air to the closed chamber to make the partitioning element oscillates. An oscillation of the partitioning element generates low-frequency seismic waves.

20 Claims, 10 Drawing Sheets

(56) References Cited

U.S. PATENT DOCUMENTS

2011/0162906 A1 7/2011 Harper et al.
2011/0170375 A1 7/2011 Thompson et al.
2012/0048642 A1 3/2012 Hopperstad et al.
2013/0100778 A1 4/2013 Ruet et al.

* cited by examiner

METHOD AND SYSTEM FOR LOW-FREQUENCY PRESSURIZED SOURCE

RELATED APPLICATIONS

The present application is a division of U.S. patent application Ser. No. 14/177,537, filed Feb. 11, 2014, which is related to, and claims priority from U.S. Provisional Patent Application No. 61/839,938, filed Jun. 27, 2013, entitled "Low Frequency Air Driven Source" to Herve RICHER DE FORGES, Robert DOWLE and John SALLAS, the disclosure of which is incorporated herein by reference.

BACKGROUND

Technical Field

Embodiments of the subject matter disclosed herein generally relate to methods and systems and, more particularly, to mechanisms and techniques for increasing low-frequency content of seismic energy generated by a marine seismic source array.

Discussion of the Background

Reflection seismology is a method of geophysical exploration to determine the properties of a portion of a subsurface layer in the earth, information that is especially helpful in the oil and gas industry. Marine reflection seismology is based on the use of a controlled source that sends energy waves into the earth. By measuring the time it takes for the reflections to come back to plural receivers, it is possible to estimate the depth and/or composition of the features causing such reflections. These features may be associated with subterranean hydrocarbon deposits.

Figure 1:
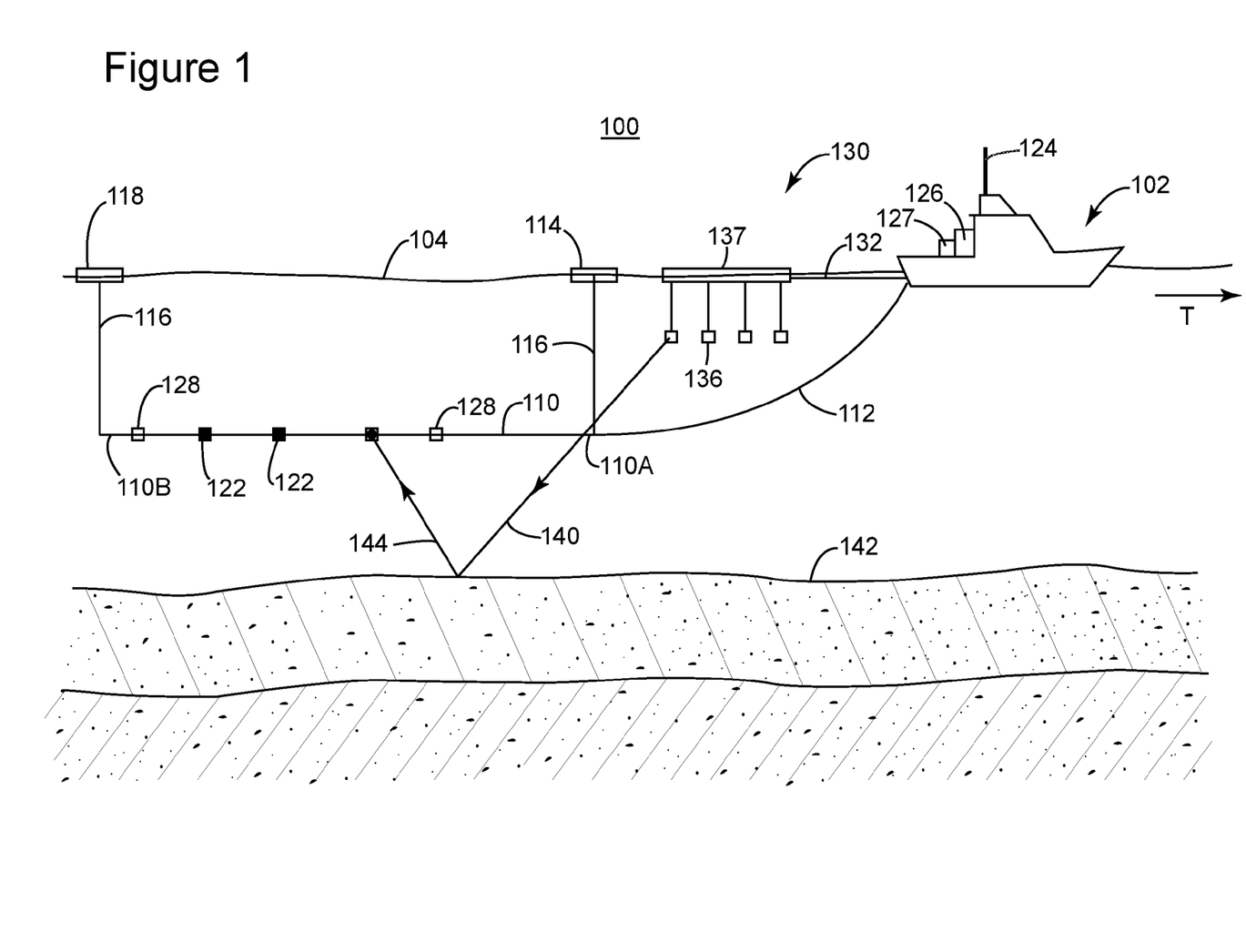
FIG. 1 is a schematic diagram of a seismic acquisition system.

For marine applications, a seismic survey system 100, as illustrated in FIG. 1, includes a vessel 102 that tows plural streamers 110 (only one is visible in the figure) and a seismic source 130. Streamer 110 is attached through a lead-in cable (or other cables) 112 to vessel 102, while source array 130 is attached through an umbilical 132 to the vessel. A head float 114, which floats at the water surface 104, is connected through a cable 116 to the head end 110A of streamer 110, while a tail buoy 118 is connected, through a similar cable 116, to the tail end 110B of streamer 110. Head float 114 and tail buoy 118 are used, among other things, to maintain the streamer's depth. Seismic sensors 122 are distributed along the streamer and configured to record seismic data. Seismic sensors 122 may include a hydrophone, geophone, accelerometer or a combination thereof. Positioning devices 128 are attached along the streamer and controlled by a controller 126 for adjusting a position of the streamer according to a survey plan.

Source array 130 has plural source elements 136, which are typically air guns. The source elements are attached to a float 137 to travel at desired depths below the water surface 104. During operation, vessel 102 follows a predetermined path T while source elements (usually air guns) 136 emit seismic waves 140. These waves bounce off the ocean bottom 142 and other layer interfaces below the ocean bottom 142 and propagate as reflected/refracted waves 144, which are recorded by sensors 122. The positions of both source elements 136 and recording sensors 122 may be estimated based on GPS systems 124 and recorded together with the seismic data in a storage device 127 onboard the vessel. Controller 126 has access to the seismic data and may be used to achieve quality control or even fully process the data. Controller 126 may also be connected to the vessel's navigation system and other elements of the seismic survey system, e.g., positioning devices 128.

A source element may be impulsive (e.g., an air gun) or vibratory. A vibratory source element is described in U.S. patent application Ser. No. 13/415,216 (herein the '216 application), filed on Mar. 8, 2012, and entitled, "Source for Marine Seismic Acquisition and Method," assigned to the same assignee as the present application, the entire content of which is incorporated herein by reference.

Presently, the air gun is the work horse of marine seismic acquisition. However, neither air guns nor existing vibratory source elements are effective in the low-frequency range of the spectrum, mainly in the 1 to 10 Hz range. In other words, energy generated by an air gun in the low-frequency spectrum is too weak to be reflected to seismic receivers to be recorded. The low-frequency energy range is useful in seismic exploration because it provides better seismic energy depth penetration, which is extremely valuable for imaging complex geological settings, such as sub-salt, basalt, chalk or even dense carbonate. New processing methods, such as full wave inversion (e.g., a data-fitting procedure based on full-wavefield modeling to extract quantitative information from seismic data) can benefit greatly from increased energy in the low-frequency range.

Thus, there is a need to obtain the low-frequency range to better interpret seismic data. To be able to record such data, source arrays need to be adjusted/modified to generate low-frequency content. Therefore, it is desirable to provide source elements and methods capable of generating low-frequency energy.

SUMMARY

According to one exemplary embodiment, there is a source element including a housing; a partitioning element placed inside the housing and configured to split the housing in a closed chamber and an opened chamber; and a valve in fluid communication with the closed chamber and configured to supply high-pressure air to the closed chamber to make the partitioning element oscillates. An oscillation of the partitioning element generates low-frequency seismic waves.

According to another embodiment, there is a method for generating low-frequency seismic energy. The method includes deploying in water a source element that includes a housing split into a closed chamber and an opened chamber by a partitioning element; supplying compressed air to the closed chamber so that the partitioning element moves toward the opened chamber; generating low-frequency seismic waves by moving the partitioning element; and venting the closed chamber for returning the partitioning element.

According to yet another embodiment, there is a source element that includes a housing having an open end freely communicating with seawater and a closed end configured to hold air; a valve that communicates with the closed end; and a controller connected to the valve and configured to supply compressed air such that an air-water interface formed inside housing moves toward the open end and also configured to remove the compressed air from the closed end so that the air-water interface moves toward the closed end. A movement of the air-water interface generates low-frequency seismic waves.

According to still another embodiment, there is a method for generating low-frequency seismic energy. The method includes deploying in water a source element having an open end and a closed end, the open end being configured to allow the water to partially enter inside a housing of the source element; increasing an air pressure at the closed end so that an air-water interface moves toward the open end; generating a seismic wave by moving the air-water interface; and venting out the compressed air from the closed end for displacing the air-water interface toward the closed end.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a source element configured to generate low-frequency acoustic energy in a marine environment. However, the embodiments to be discussed next are not limited to a marine source element; they may be applied to source arrays (i.e., to a collection of source elements) or even to land sources.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a source element is configured to generate low-frequency seismic energy to improve the low-frequency spectrum of a source array. The output of various low-frequency source elements can fill in the energy often lacking in conventional marine surveys where air gun sources are used. In one application, various low-frequency source elements are presented, each of which outputs low-frequency energy over a given portion of the low-frequency range of frequencies of interest. The low-frequency range of frequencies is mainly considered to extend from 1 Hz up to about 10 Hz. Above 10 Hz, existing air gun sources provide adequate source strength.

Figure 2:
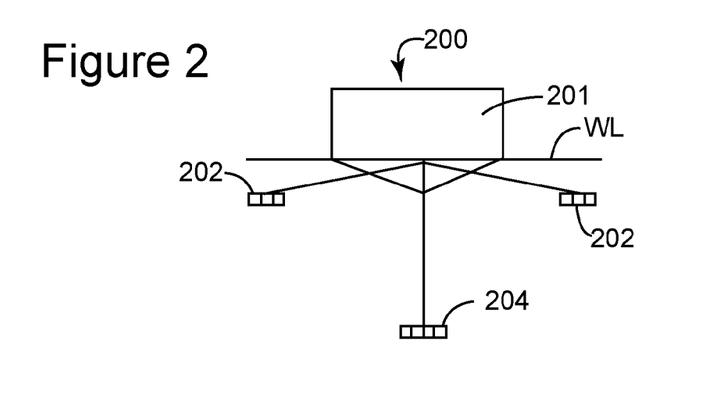
FIGS. 2 and 3 are schematic diagrams of a source array having low-frequency and high-frequency source arrays.

When implemented in an actual seismic survey system, a seismic source array 200 having one or more of the novel source elements to be discussed next may have, as illustrated in FIG. 2, two high-frequency sub-arrays 202 and a single low-frequency sub-array 204 that are towed by a vessel 201. In one application, all the sub-arrays are towed below the water line WL. Other configurations for the sub-array may be possible. Each sub-array may have plural source elements. In one application, the high-frequency sub-arrays 202 are towed at a depth of about 5 m, while the low-frequency sub-array 204 is towed at a depth of about 25 m.

Figure 3:
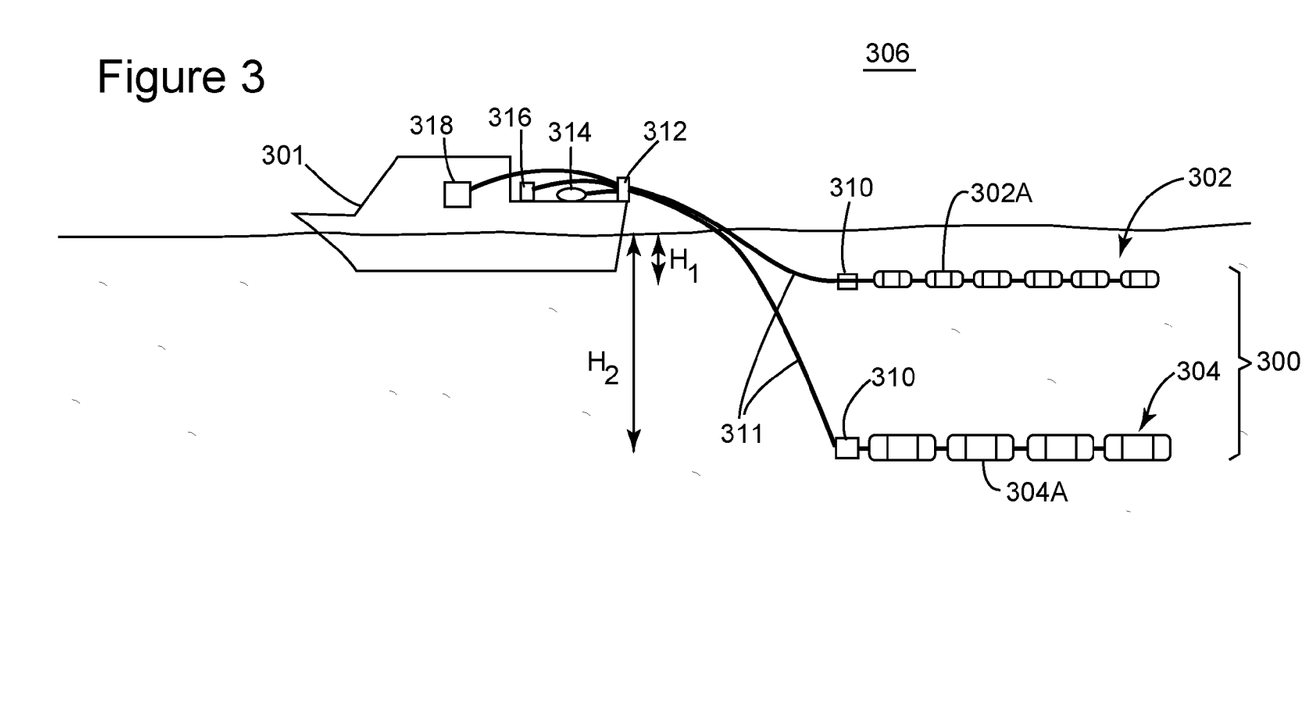

A side view of a marine acquisition system 306 that includes high-frequency seismic sources 302A (e.g., air guns) and low-frequency seismic sources 304A (to be discussed later) is illustrated in FIG. 3. System 306 includes towing vessel 301 that tows source array 300. Source array 300 may include, as discussed with regard to FIG. 2, one or more high-frequency sub-arrays 302 positioned at a depth H1 below the water line and one or more low-frequency sub-arrays 304 positioned at a depth H2 below the water line, where H2 is deeper than H1. Depth controllers 310 may be located on or next to each sub-array for maintaining a desired depth. Umbilicals 311 connect each sub-array to vessel 301. An umbilical may include a strength member, command and data capabilities, electrical power and pneumatic air supply.

Mechanical interface 312 connects corresponding umbilical components to pneumatic supply system 314, power supply system 316, and command and control device 318. Command and control device 318 may include a processing unit, as described later, that is capable of receiving and processing seismic data for imaging the surveyed subsurface. Command and control device 318 may also be configured to control the seismic source array's trajectory, adjust its trajectory and control the shooting of the source elements. Command and control device 318 may interact with the vessel's navigation system.

Although FIG. 3 shows each sub-array having a horizontal distribution, note that multi-level source sub-arrays (i.e., source elements distributed along a curved line or a variable-depth line) may be used instead of horizontal source sub-arrays 302 and/or 304. The above embodiments were discussed without specifying the type of seismic receivers used to record seismic data. In this sense, it is known in the art to use, for a marine seismic survey, streamers towed by one or more vessels, and the streamers include seismic receivers that may include hydrophones, geophones, accelerometers, other particle motion sensors, electro-magnetic sensors or a combination thereof. Also, the streamers on which the receivers are distributed may be horizontal, slanted or have a curved profile as disclosed, for example, in patent application Ser. No. 13/464,149, the entire content of which is incorporated herein by reference. In one application, the receivers may be distributed on autonomous underwater vehicles, on ocean bottom cables or other platforms.

In one application, sub-arrays 302 are configured to generate frequencies between about 10 and 200 Hz, while sub-array 304 is configured to generate frequencies between about 0.1 to 10 Hz. The source elements of these sub-arrays may be activated using a flip-flop scheme, a continuous scheme or any other known scheme. Next, various embodiments are discussed with regard to novel low-frequency source elements.

Figure 4:
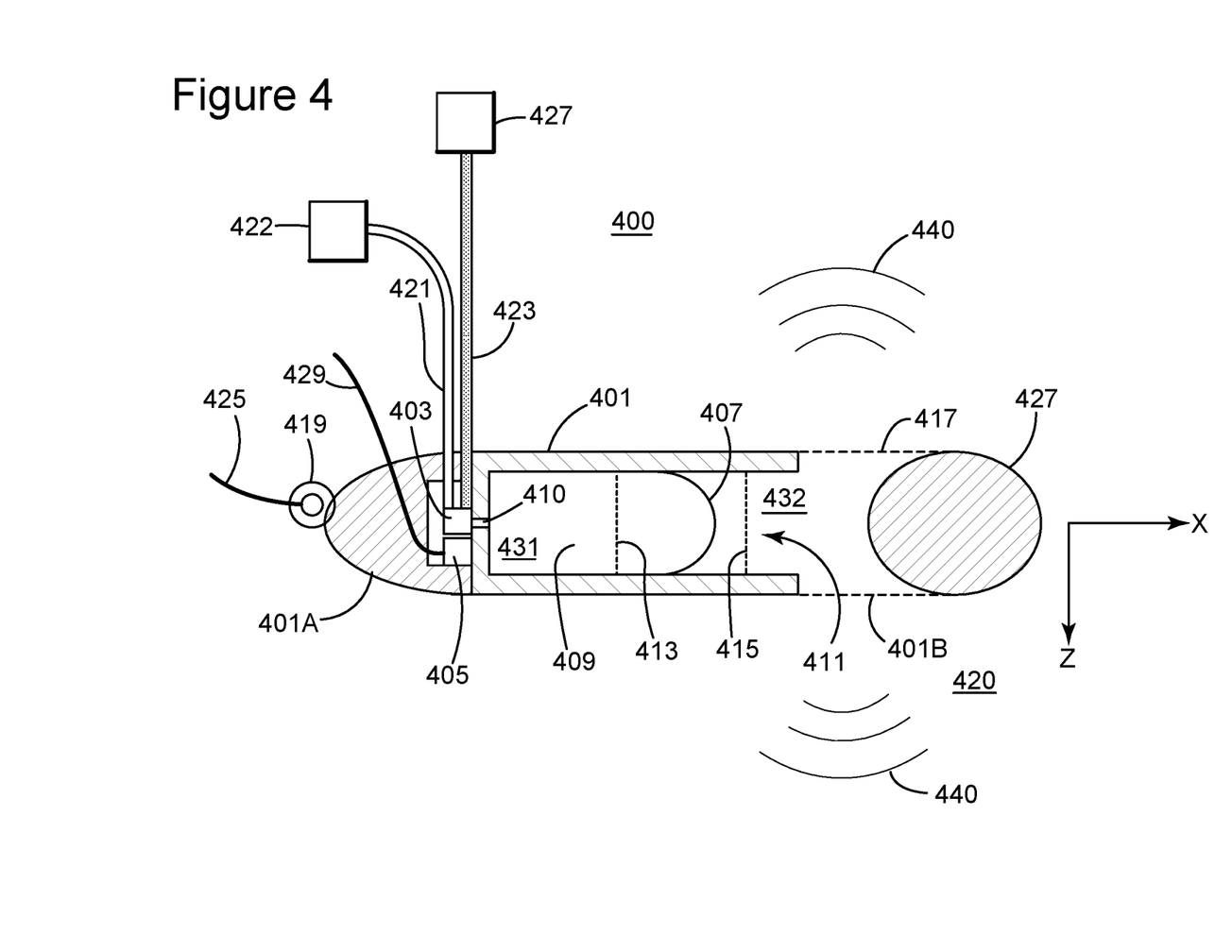
FIG. 4 is a schematic diagram of a source element configured to emit low-frequency energy.

In one embodiment, a low-frequency source element 400 is illustrated in FIG. 4. Low-frequency source element 400, also called a pneuma-acoustic projector. Source element 400 has a housing 401 that extends along a horizontal axis X, which is substantially perpendicular to gravity Z. Source element 400 is designed to be towed horizontally to reduce drag. A tow cable 425 connects the vessel (not shown) to a fastener 419, which is fixedly attached to nose 401A of housing 401. Nose 401A may be shaped to reduce drag during towing.

Housing 401 includes a closed chamber 409 and an opened chamber 411. Closed chamber 409 does not communicate with the ambient water, and for this reason is called "closed," while opened chamber 411 communicates with the ambient water and for this reason is called "opened." The two chambers are separated by a partitioning element 407, which may be a flexible member having its perimeter (or circumference) fixedly attached to the housing 401, or may be a movable piston, a movable part or a means for separating. If partitioning element 407 is a flexible member, e.g., a diaphragm or membrane, or a piston, two stopping elements 413 and 415, e.g., screens, may be located in the closed and opened chambers, respectively, to limit movement of the partitioning element 407.

Opened chamber 411 communicates with ambient 420 through one or more openings 417 located at the tail end 401 B of housing 401. The ambient 420 may be considered to be the marine ambient. Openings 417 may be disposed circumferentially around the tail end 401 B of housing 401. Housing 401 may be cylindrical or have other shapes.

A valve 403 may be housed within nose 401A. Valve 403 may be fluidly connected to a supply line 421 and to a low pressure source 427 through a vent line 423. Low pressure source 427 may be the atmospheric pressure or a low pressure reservoir that has air pumped out of it continuously. Supply line 421 may be connected to a compressed air source 422, located on the vessel or on the source array. Vent line 423 may be also connected to the vessel or made to fluidly communicate with the environment. A controller 405 may be located in nose 401A of the housing and is configured to control valve 403. Valve 403 may be an a servo-valve, an electro-pneumatic valve, e.g., a three-way valve or a three-way spool valve, or two individual proportional valves with one variable orifice used for introducing high-pressure air supplied through supply line 421 into closed chamber 409. A second variable orifice may be used for venting the air from closed chamber 409 through exhaust hose 423. Valve 403 fluidly communicates with closed chamber 409 through passage 410. In one application, valve 403 may be either a direct drive type or may have a pilot valve (not shown) to drive the main valve.

Controller 405 is in communication with the vessel and data acquisition system via power and communication cable 429. Controller 405 is also in communication with valve 403 and is configured to control this valve. When valve 403 is controlled to make supply line 421 fluidly communicate with closed chamber 409, compressed air 431 is supplied inside closed chamber 409 and pressurized. Partitioning element 407 is then driven toward opened chamber 411, causing water 432 inside the opened chamber to be forced out of it. The water passes through stopping element 415 and exits through openings 417. By allowing the water to exit radially through openings 417 rather than axially, the reaction forces tend to be cancelled out, which reduces the vibration of source element 400. Diverter 427 closes one end of opened chamber 411, and it may be shaped to steer radially the exiting or entering water. Diverter 427 is shown having a round shape in FIG. 4. However, diverter 427 may have different shapes as long as the water volume exiting or entering the opened chamber is diverted along directions substantially perpendicular to longitudinal axis X. Alternatively, a means for diverting may be used for diverting the water volume as noted above.

To reduce the pressure inside closed chamber 409, valve 403 is instructed to close the valve inlet orifice and open the exhaust orifice so the air located inside closed chamber 409 is now in communication with vent line 423. As the air is exhausted, partitioning element 407 moves to the left in FIG. 4. First and second stopping elements 413 and 415 allow the air, but not partitioning element 407, to pass.

Figure 5:
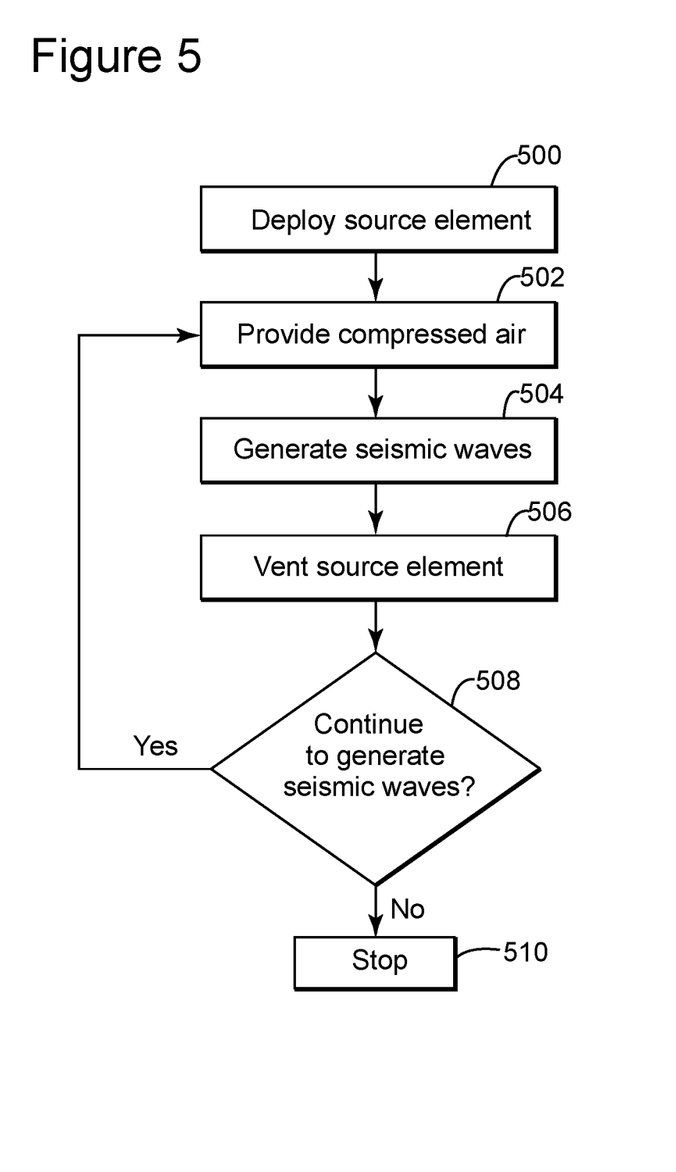
FIG. 5 is a flowchart of a method for actuating the source element illustrated in FIG. 4.

A method for actuating source element 400 is now described with regard to FIG. 5. In step 500, the source element is deployed in water. In step 502, controller 405 instructs valve 403 to fluidly connect closed chamber 409 with supply line 421 so that compressed air is supplied inside the closed chamber. As a consequence of the increased pressure inside closed chamber 409, partitioning element 407 moves toward opened chamber 411, partially pushing the water volume inside the opened chamber outside housing 401. Seismic waves 440 may be symmetrically generated around housing 401 in step 504. Excess air from closed chamber 409 is now removed through vent line 423 in step 506, also under the instruction of controller 405. Controller 405 may be programmed to supply and remove the air from closed chamber 409 with a desired frequency, so that seismic waves generated by the partitioning element's back and forth movement have a low-frequency. This action is achieved by instructing valve 403 to fluidly connect vent line 423 with closed chamber 409. Due to this step, partitioning element 407 moves back toward its original position. Note that the initial pressure inside the closed chamber, i.e., before supplying compressed air, may be the ambient pressure so that similar pressures are on both sides of partitioning element 407. The above cycle may then be repeated if a condition determined in step 508 is met, i.e., a time period for generating seismic waves is smaller than a predetermined period of time. If the condition is not met, the process advances to step 510 and stops.

The amount of compressed air and/or its pressure are source-dependent and also depend on the estimated locations of the target subsurface, and various optimization studies need to be performed to determine these parameters. In one application, plural source elements 400 are grouped together to form the low-frequency source sub-array 304 illustrated in FIG. 3. In another embodiment, traditional low-frequency source elements 200 are combined with one or more of the novel source elements of FIG. 4 to form sub-array 304. In one embodiment, the source elements are attached to a common float to maintain them at predetermined depths. However, it is possible to tow the source elements without the float.

Figure 6:
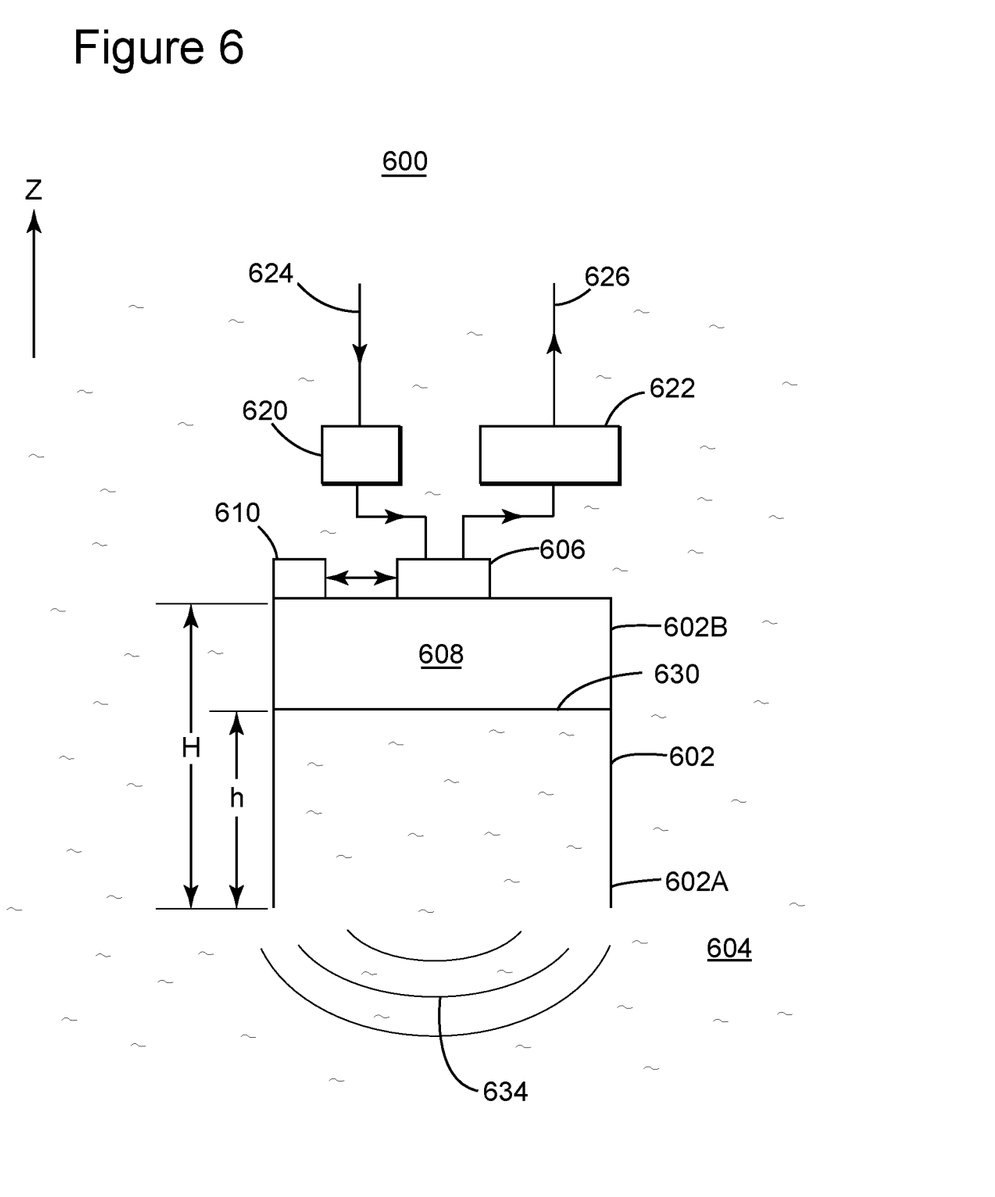
FIG. 6 is a schematic diagram of another source element configured to emit low-frequency energy.

Another low-frequency source element is now described with regard to FIG. 6. Source element 600 has a housing 602 with an open end 602A that directly communicates with environment 604, usually seawater, and a closed end 602B. A valve 606 is attached to housing 602 and fluidly communicates with an interior 608 of housing 602. Valve 606 may be similar to valve 403 discussed with regard to FIG. 4, which acts as a flow control proportional valve or a combination of valves may be used: for example, a servovalve configured to act as a pressure control valve or still another possibility would be utilization of separate solenoid activated valves with one for pressurization and another for venting. Valve 606 may be controlled by a local controller

610. In one application, valve 606 is a three-way valve, having a first position that communicates interior 608 with a high-pressure source 620, a second position that communicates interior 608 with a low-pressure source 622, and a third position in which interior 608 is insulated, i.e., the valve is shut. In one application, high-pressure source 620 may be an accumulator. The accumulator may have a volume of about 5 liters (l) and a pressure of about 14 MPa. High-pressure source 620 may be connected through a supply line 624 to a compressor (not shown) located on a towing vessel and may receive high-pressure air from the vessel. Low-pressure source 622 may be a low-pressure accumulator, having, for example, a volume of about 700 l and a pressure of about 0.1 MPa. Low-pressure source 622 may communicate with the ambient through a vent pipe 624. In one embodiment, low-pressure source 622 is just a compartment in housing 602. The low- and high-pressure sources may be located close to the source element. In one application, both sources are located on housing 602. In another application, both sources are attached to a float of the source sub-array.

Figure 7:
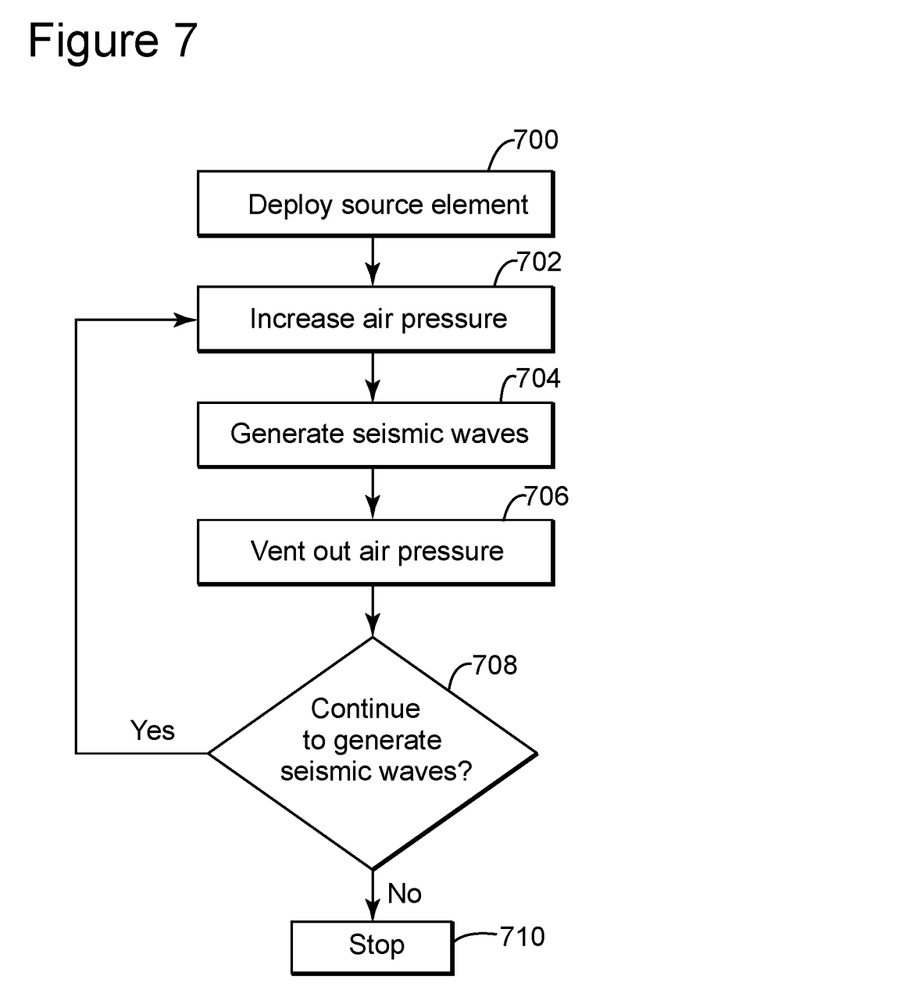
FIG. 7 is a flowchart of a method for actuating the source element illustrated in FIG. 6.

When in use, source element 600 generates seismic waves as now discussed with regard to FIG. 7. Source element 600 is deployed in water in step 700. Water 604 partially enters housing 602 and a water-air interface 630 is formed, with air being present above interface 630 and water below. In other words, a length of the inside of housing 602 is H and a length of the water column inside the housing is h. The air pressure above the interface is balanced out by water pressure below. Valve 606 is in the shut position. In step 702, valve 606 is controlled by controller 610 to fluidly communicate inside 608 with high-pressure source 620 to increase the air pressure. This pressure increase forces interface 630 away from valve 606, forcing water volume inside the housing to oscillate, which in turn generates seismic waves 634 in step 704. Controller 610 then changes a state of valve 606 so that inside 608 is in fluid communication with low-pressure source 622 in step 706. Thus, the pressure of inside 608 decreases until interface 630 returns to its initial position of step 700. Controller 610 may be programmed to supply and remove air from inside 608 with a desired frequency, so that seismic waves generated by the movement of the air-water interface back and forth have a low frequency. In other words, alternately supplying and removing compressed air from closed end 602B generates low-frequency waves. In step 708 a determination is made whether to continue to generate seismic waves. If this determination is yes, the process returns to step 702 to continue generating seismic waves. If the determination is no, the process advances to step 710 and stops. The determination may include a timer that times out after a predetermined amount of time, at which instant the result of the determination is "NO."

In one application, an area of open end 602A is about 1 m$^2$. For such a large opening, and because water column displacement may be large, for example, about 0.5 m, it may not be feasible to use a flexible member at interface 630 for separating air from seawater. Thus, there is a possibility that seawater may come into contact with the interior of valve 606 and low-pressure source 622. This means that these parts need to be non-corrosive, or a barrier needs to be put in place to prevent seawater from touching these parts. According to an embodiment illustrated in FIG. 8, a barrier 860 is provided at the air-water interface. Barrier 860 may have its perimeter shaped to match a stopping member 862, which is fixedly attached to an inside of housing 802. Barrier 860 may be a float that floats in water so the presence of water makes the float move upward, along the Z direction, opposite gravity. Once barrier 860 contacts stopping member 862, it stops and creates a seal around its perimeter so that seawater cannot move past the barrier. A barrier guide mechanism 864 is configured to guide the barrier along the Z direction. The barrier guide mechanism may be a pole in one embodiment, and barrier 860 may have a hole for receiving the pole.

Figure 8:
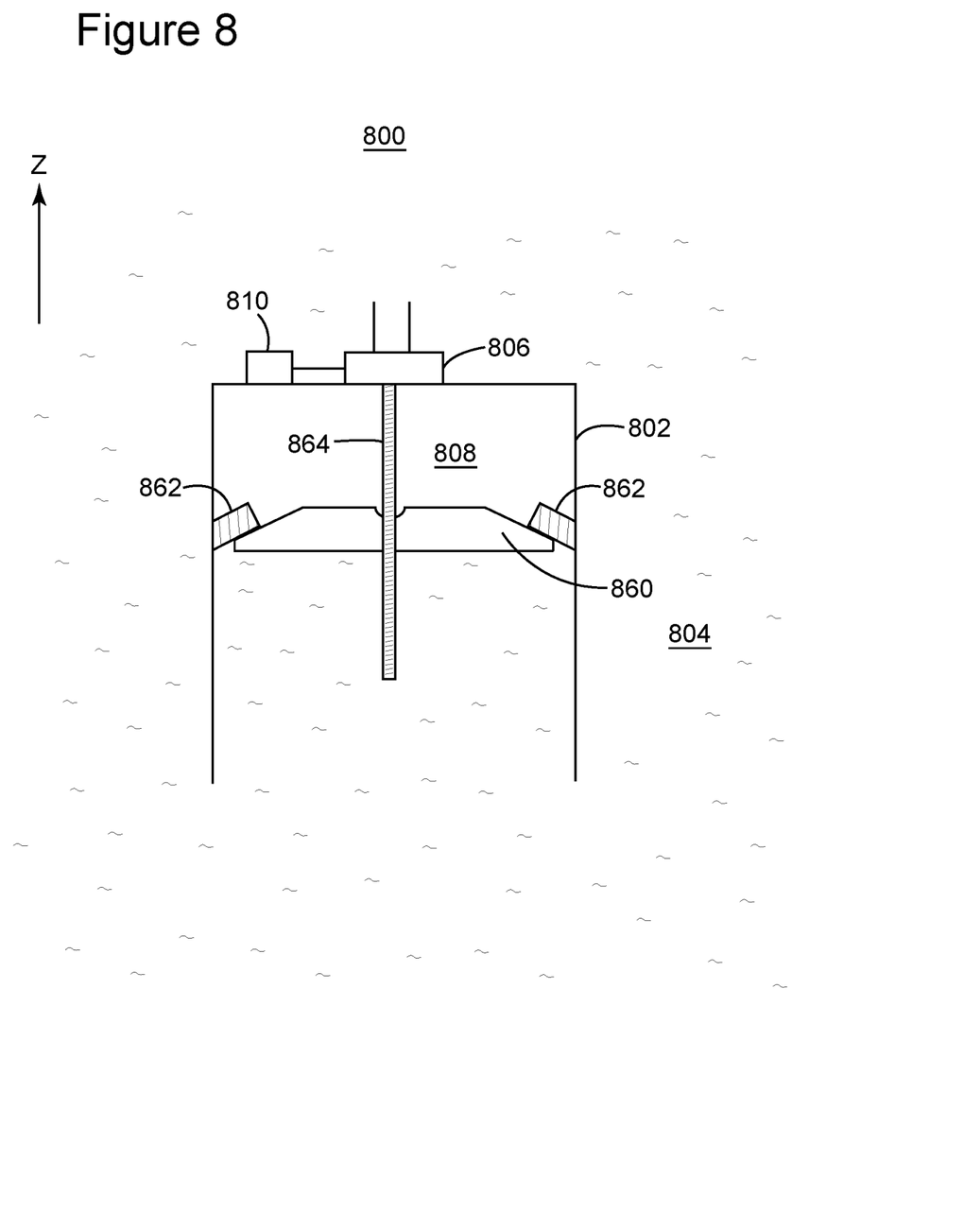
FIG. 8 is a schematic diagram of a variation of the source element illustrated in FIG. 6.

Controller 610 or 810 may be programmed to open and close valve 606 or 806 to cause the source element to emit a damped sinusoid at the desired frequency and desired damping rate. Note that controller 610 or 810 controls positive acceleration of the air-water interface (or water column) by allowing high-pressure air to enter the housing, and creates a negative acceleration of the interface (or water column) by venting out the high-pressure air.

Figure 9A:
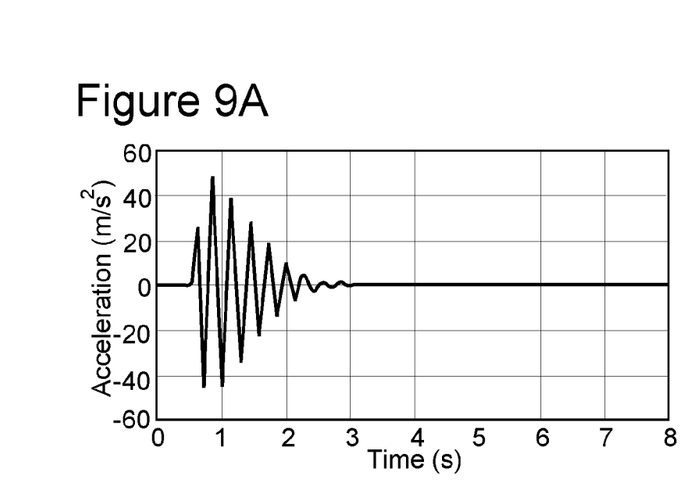
FIGS. 9A-D are graphs illustrating various characteristics of a low-frequency source element.
Figure 9B:
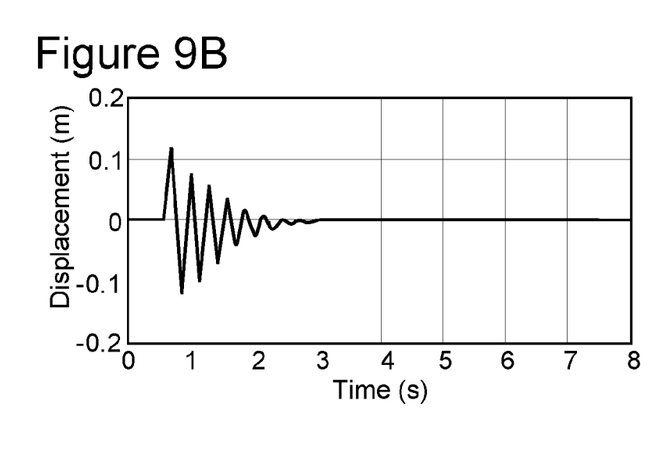
Figure 9C:
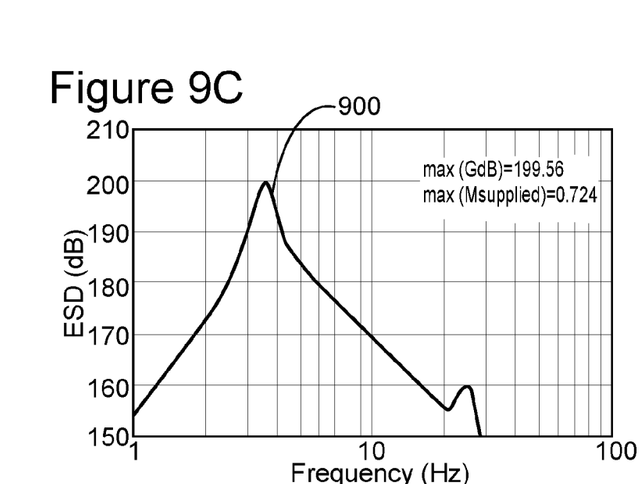
Figure 9D:
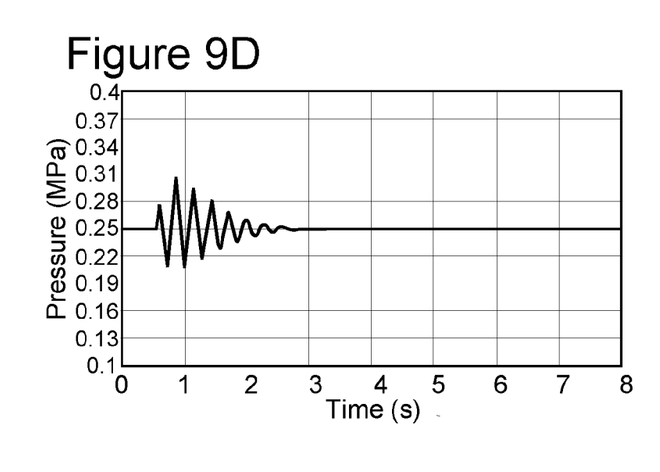

According to one embodiment, assuming that H is about 1.4 m, h is the initial height of the water column and is about 0.7 m, the internal diameter of housing 602 being about 1.13 m, an intake orifice area is about 0.002 m$^2$, an exhaust orifice area is about 0.024 m$^2$, and a target of energy spectral density (ESD) is about 200 dB, the results illustrated in FIGS. 9A-D are obtained. FIG. 9A illustrates water column acceleration, FIG. 9B illustrates water column displacement, FIG. 9C illustrates ESD, and FIG. 9D illustrates pressure inside the housing versus time. Note the 3.5 Hz resonance frequency 900 in FIG. 9C.

In one application, plural source elements 600 are used in a source array, with a subset of them configured to emit in the 2-4 Hz range with a resonance at 3 Hz, and another subset configured to emit in the 4-8 Hz range with a resonance at 5 Hz. These numbers are exemplary and are not intended to limit the applicability of the embodiments. In other words, plural source elements 600 may be grouped in various ways to cover different frequency ranges with a resonance frequency inside each range. In one application, each source element 600 has a single resonance frequency.

Figure 10:
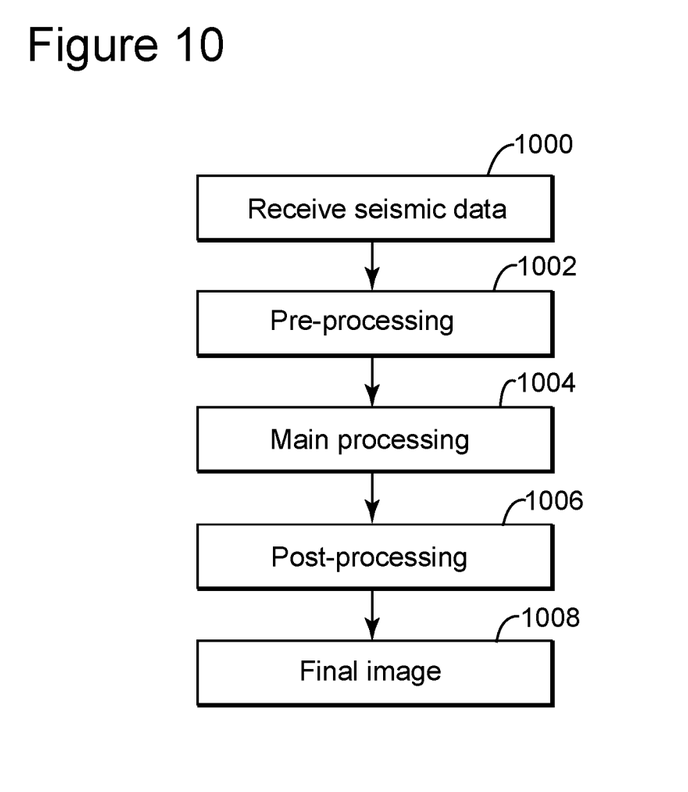
FIG. 10 is a flowchart of a method for processing seismic data acquired with a low-frequency source element.

Seismic data generated by the seismic sources discussed above and acquired with the streamers also noted above may be processed in a corresponding processing device for generating a final image of the surveyed subsurface as discussed now with regard to FIG. 10. For example, the seismic data generated with the source elements as discussed with regard to FIGS. 4, 6 and 8 may be received in step 1000 at the processing device. In step 1002, pre-processing methods are applied, e.g., low pass filtering to separate out the low frequency data set from the conventional seismic, demultiple, signature deconvolution, trace summing, motion correction, vibroseis (method of vibrating an element of a source for generating a seismic signal) correlation (might use this as an alternative to low pass filtering to remove data that was generated by a marine vibrator), resampling, etc. In step 1004, the main processing takes place, e.g., deconvolution, amplitude analysis, statics determination, common middle point gathering, velocity analysis, normal move-out correction, muting, trace equalization, stacking, noise rejection, amplitude equalization, etc. In step 1006, final or post-processing methods are applied, e.g. migration, wavelet processing, seismic attribute estimation, inversion, etc., and in step 1008 the final image of the subsurface is generated.

Figure 11:
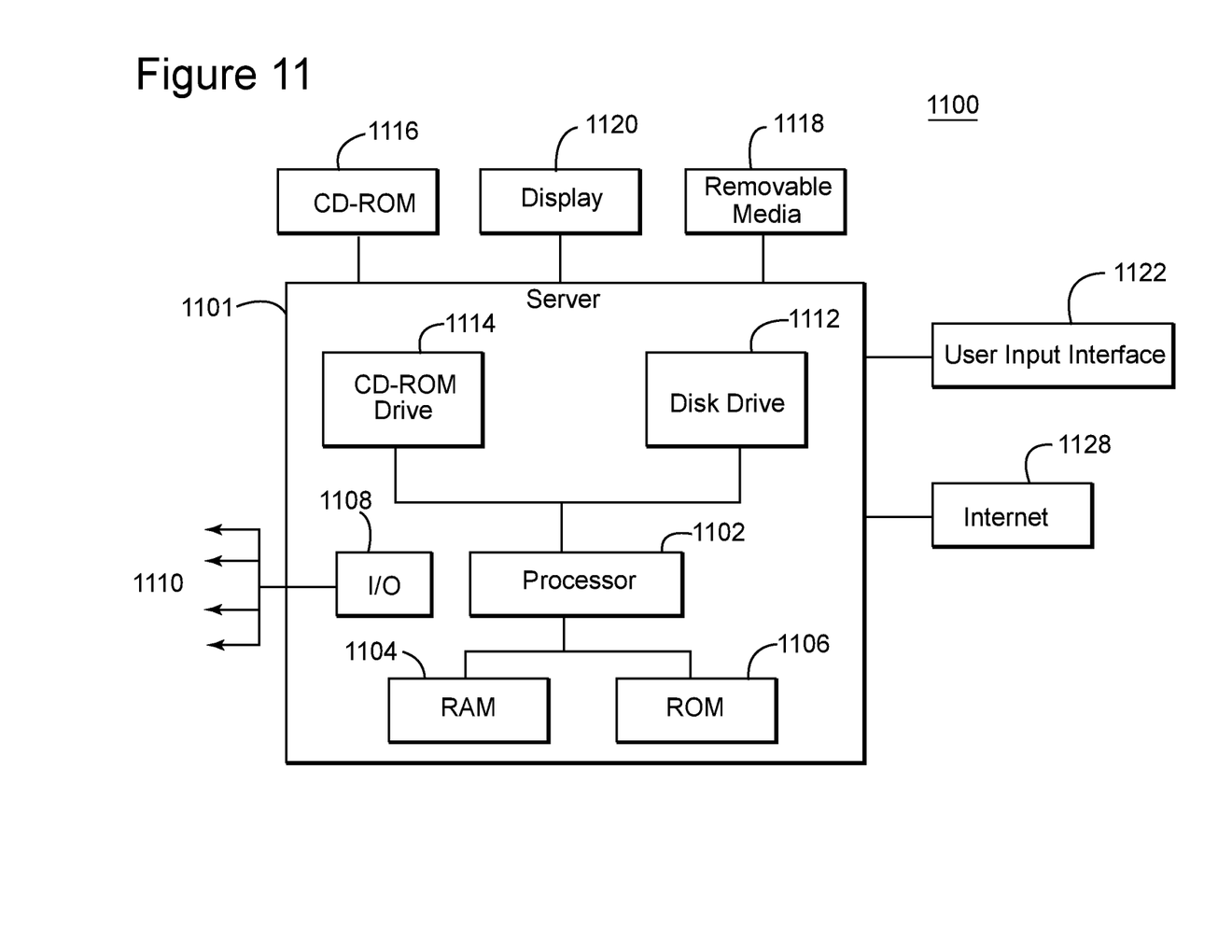
FIG. 11 is a schematic diagram of a control device for implementing methods as noted above.

An example of a representative processing device capable of carrying out operations in accordance with the embodiments discussed above is illustrated in FIG. 11. Hardware, firmware, software or a combination thereof may be used to perform the various steps and operations described herein. The processing device 1100 of FIG. 11 is an exemplary computing structure that may implement any of the processes and methods discussed above or combinations of them.

The exemplary processing device 1100 suitable for performing the activities described in the exemplary embodiments may include server 1101. Such a server 1101 may include a central processor unit (CPU) 1102 coupled to a random access memory (RAM) 1104 and/or to a read-only memory (ROM) 1106. ROM 1106 may also be other types of storage media to store programs, such as programmable ROM (PROM), erasable PROM (EPROM), etc. Processor 1102 may communicate with other internal and external components through input/output (I/O) circuitry 1108 and bussing 1110 to provide control signals and the like. For example, processor 1102 may communicate with appropriate valves of the source elements for controlling the air pressure inside each source element. Processor 1102 carries out a variety of functions as are known in the art, as dictated by software and/or firmware instructions.

Server 1101 may also include one or more data storage devices, including disk drives 1112, CD-ROM drives 1114, and other hardware capable of reading and/or storing information, such as a DVD, etc. In one embodiment, software for carrying out the above-discussed steps may be stored and distributed on a CD-ROM 1116, removable media 1118 or other form of media capable of storing information. The storage media may be inserted into, and read by, devices such as the CD-ROM drive 1114, disk drive 1112, etc. Server 1101 may be coupled to a display 1120, which may be any type of known display or presentation screen, such as LCD, plasma displays, cathode ray tubes (CRT), etc. A user input interface 1122 is provided, including one or more user interface mechanisms such as a mouse, keyboard, microphone, touch pad, touch screen, voice-recognition system, etc.

Server 1101 may be coupled to other computing devices, such as the equipment of a vessel, via a network. The server may be part of a larger network configuration as in a global area network (GAN) such as the Internet 1128, which allows ultimate connection to the various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such a floppy disk or magnetic tape. Other non-limiting examples of computer-readable media include flash-type memories or other known types of memories.

The disclosed exemplary embodiments provide a source array, sub-array and source element capable of boosting an energy generated in the 0.1 to 10 Hz range. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A source element comprising:
a housing having an open end freely communicating with seawater and a closed end configured to hold air;
a valve that fluidly communicates with the closed end; and
a controller connected to the valve and configured to control the valve to supply compressed air such that an air-water interface formed inside housing moves toward the open end and also configured to control the valve to remove the compressed air from the closed end so that the air-water interface moves toward the closed end,
wherein the air-water interface includes a portion in which the compressed air is in direct contact with the seawater, and
wherein a movement of the air-water interface generates low-frequency seismic waves.

2. The source element of claim 1, further comprising:
a high-pressure source connected to the valve; and
a low-pressure source connected to the valve,
wherein the high-pressure source supplies the compressed air and the low-pressure source removes the compressed air.

3. The source element of claim 2, wherein the high- and low-pressure sources are located on the housing.

4. The source element of claim 1, wherein the housing extends along gravity, with the open end facing the ocean bottom.

5. The source element of claim 1, further comprising:
a barrier element located inside housing and configured to prevent water to reach the closed end; and
a stopping member attached to housing and configured to prevent barrier element from reaching the closed end.

6. The source element of claim 5, wherein the barrier element is configured to move up and down and form a seal when in contact with the stopping member.

7. The source element of claim 5, further comprising:
a guiding mechanism for guiding a movement of the barrier element.

8. The source element of claim 1, further comprising:
a high-pressure accumulator that supplies the compressed air to the valve; and
a low-pressure accumulator that receives the compressed air from the closed end.

9. The source element of claim 8, wherein the high-pressure accumulator is connected through a supply line to a compressor on a towing vessel.

10. The source element of claim 8, wherein the low-pressure accumulator is connected through a vent pipe to the ambient.

11. The source element of claim 8, wherein the low-pressure accumulator is a compartment inside the housing.

12. The source element of claim 8, wherein both the low-pressure and high-pressure accumulators are located on the housing.

13. The source element of claim 5, wherein the barrier element floats in water.

14. The source element of claim 7, wherein the guiding element is a pole and the barrier element has a hole that receives the pole.

15. A method for generating low-frequency seismic energy, the method comprising:
    deploying in water a source element having an open end and a closed end, the open end being configured to allow the water to partially enter inside a housing of the source element;
    increasing an air pressure at the closed end by introducing compressed air so that an air-water interface moves toward the open end;
    generating a seismic wave by moving the air-water interface; and
    venting out the compressed air from the closed end for displacing the air-water interface toward the closed end,
    wherein the air-water interface includes a portion in which the compressed air is in direct contact with the water.

16. The method of claim 15, wherein a valve fluidly connected to the closed end supplies and removes the compressed air.

17. The method of claim 16, further comprising:
    alternately supplying and removing the compressed air for generating the low-frequency waves.

18. The method of claim 15, further comprising:
    determining whether to continue to generate seismic waves.

19. The method of claim 18, wherein the step of determining uses a timer.

20. The method of claim 17, wherein the supplying and removing of the compressed air for generating the low-frequency waves is performed with a desired frequency.

* * * * *